US012205485B2

(12) United States Patent
Porfilio et al.

(10) Patent No.: US 12,205,485 B2
(45) Date of Patent: *Jan. 21, 2025

(54) SCREENLESS SMART LEARNING TOY AND SYSTEM

(71) Applicant: Kiri, Inc., Brooklyn, NY (US)

(72) Inventors: Nicholas Porfilio, East Hampton, NY (US); Jacob Starley, Brooklyn, NY (US); Justin Egbert, Odgen, UT (US); Robert Monson, Vineyard, UT (US)

(73) Assignee: Kiri, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,695

(22) Filed: Aug. 28, 2023

(65) Prior Publication Data
US 2024/0071239 A1 Feb. 29, 2024

Related U.S. Application Data

(63) Continuation of application No. 17/474,665, filed on Sep. 14, 2021, now Pat. No. 11,741,844.
(Continued)

(51) Int. Cl.
*G09B 1/32* (2006.01)
*A63H 5/00* (2006.01)
*A63H 33/22* (2006.01)
*G06F 3/16* (2006.01)
*G06F 40/58* (2020.01)
(Continued)

(52) U.S. Cl.
CPC .............. *G09B 1/325* (2013.01); *A63H 5/00* (2013.01); *A63H 33/22* (2013.01); *G06F 3/165* (2013.01); *G06F 40/58* (2020.01); *G06K 7/10386* (2013.01); *G09B 5/04* (2013.01);
(Continued)

(58) Field of Classification Search
CPC . G09B 1/325; G09B 5/04; G09B 7/00; H05B 45/20; H05B 47/105; A63H 5/00; A63H 33/22; A63H 2200/00; G06F 40/58; G06F 3/165; G06K 7/10386
See application file for complete search history.

(56) References Cited

U.S. PATENT DOCUMENTS 9,240,021 B2 * 1/2016 Rodriguez .............. G06F 3/017
9,354,778 B2 * 5/2016 Cornaby ................ G06F 3/0237
(Continued)

FOREIGN PATENT DOCUMENTS

CN 111111235 A * 5/2020 ............. A63H 33/42

*Primary Examiner* — Xuan M Thai
*Assistant Examiner* — Sadaruz Zaman
(74) *Attorney, Agent, or Firm* — Nicholson DeVos Webster & Elliott LLP

(57) ABSTRACT

A screenless smart toy device may be a block made of natural or wooden material and may include a transparent or semi-transparent panel allowing one or more LEDs, from within the smart toy device, to be visible when illuminated. The smart toy device may read RFID values from various objects, such as tiles having objects depicted thereupon and RFID tags embedded within, and play different sounds and/or illuminate its LEDs with different colors based on the RFID tag that was read. The smart toy device may operate in a variety of modes, such as in a play/explore mode, quiz mode, definition mode, etc. The smart toy device may be configured into different modes and/or language settings by use of a mode card or separate application.

20 Claims, 8 Drawing Sheets

Related U.S. Application Data

(60) Provisional application No. 63/077,802, filed on Sep. 14, 2020.

(51) Int. Cl.
| | |
|---|---|
| *G06K 7/10* | (2006.01) |
| *G09B 5/04* | (2006.01) |
| *G09B 7/00* | (2006.01) |
| *H05B 45/20* | (2020.01) |
| *H05B 47/105* | (2020.01) |

(52) U.S. Cl.
CPC .............. *G09B 7/00* (2013.01); *H05B 45/20* (2020.01); *H05B 47/105* (2020.01); *A63H 2200/00* (2013.01)

(56) References Cited

U.S. PATENT DOCUMENTS

| | | | |
|---|---|---|---|
| 9,484,046 B2* | 11/2016 | Knudson | G10L 25/48 |
| 10,026,332 B1* | 7/2018 | Gupta | G06F 16/335 |
| 10,552,933 B1* | 2/2020 | Calhoon | G06T 1/0092 |
| 10,957,325 B2* | 3/2021 | Hergenroeder | G09B 5/04 |
| 11,049,094 B2* | 6/2021 | Filler | G06F 3/0486 |
| 11,381,903 B2* | 7/2022 | Wilker | G10L 15/22 |
| 11,529,567 B2* | 12/2022 | Kroyan | B25J 9/1697 |
| 11,587,195 B2* | 2/2023 | Calhoon | G06Q 10/087 |
| 11,741,844 B2* | 8/2023 | Porfilio | A63H 33/22 |
| 2015/0286873 A1* | 10/2015 | Davis | G06F 1/1694 |
| | | | 382/103 |
| 2018/0117479 A1* | 5/2018 | Coolidge | G09B 5/00 |
| 2019/0022520 A1* | 1/2019 | Leeming | A63F 13/28 |
| 2019/0118104 A1* | 4/2019 | Su | G06F 3/0393 |

* cited by examiner

SCREENLESS SMART LEARNING TOY AND SYSTEM

BACKGROUND

The role of play in humans serves many valuable purposes. Play is a means by which children—and even adults—develop their physical, intellectual, emotional, social, and moral capacities. Moreover, play is a means of creating and preserving friendships, and provides a state of mind that, in adults as well as children, is well-suited for high-level reasoning, insightful problem solving, and all sorts of creative endeavors.

The benefits of technology in education are clear: kids learn better in a more personalized way. However, studies have shown that too much screen usage among children has been linked to depression, ADHD, anxiety, and social issues.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for screenless smart learning. According to some embodiments, a screenless smart toy is a smart wooden block that helps kids learn language, science/technology/engineering/mathematics (STEM), and/or any of an expanding library of subjects, all without use of a screen. Through sight, sound, and touch—together with its optional application (e.g., an app run by a smart phone or other device) for parents, guardians, or teachers—the screenless smart block provides a highly-personalized, multisensory learning experience for children of all abilities.

Currently, modern educational toys aren't well-suited for education or entertainment. One major problem is that so many of these devices have screens, or are made up of apps that require screens (via tablets, computers, smart phones, etc.) It has been observed that too much screen time can lead to particularly adverse effects on children, whose minds are still developing. Further, many toys have a very limited lifespan in which a child is truly engaged with the toy and actively learning. For example, most toys teach only one concept or a very limited number of concepts—e.g., counting, the alphabet, reading, colors, etc. Once the child has mastered this concept or has become frustrated with the device, the child loses interest, and the life of the toy has effectively ended. Further, many such toys are made of plastic, causing environmental problems such as climate change, pollution, and likely negative effects on humans. Accordingly, there is a strong need for a modern, tech-forward toy without a screen that fun, engaging, and adaptive.

Figure 1:
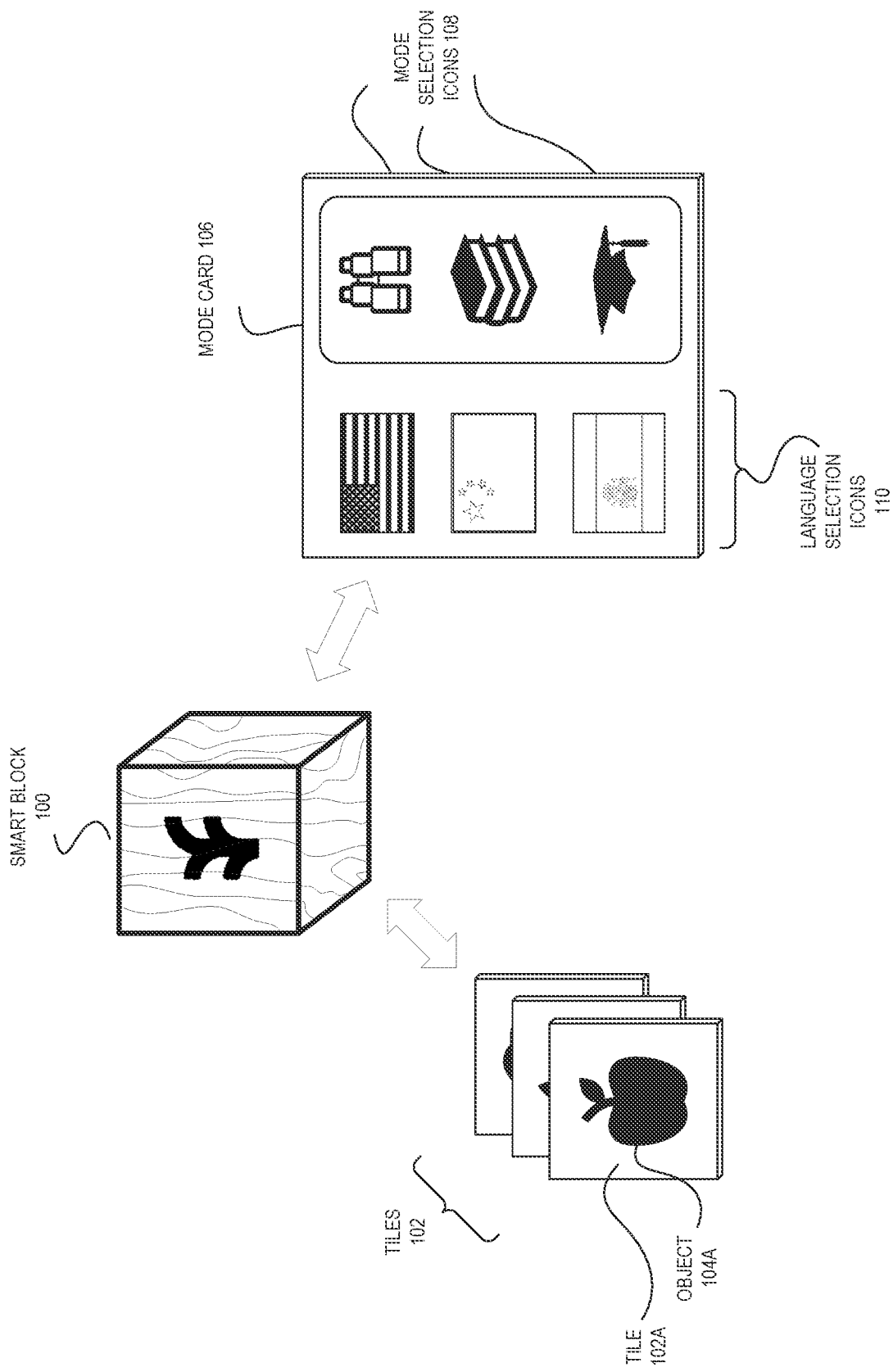
FIG. 1 is a diagram illustrating an environment including a smart block, tile, and mode card according to some embodiments.

Embodiments disclosed herein provide a multi-purpose, modular, personalizable smart toy system. FIG. 1 is a diagram illustrating an environment including a smart block 100, tiles 102, and a mode card 106 according to some embodiments. The system in some embodiments includes a smart block (e.g., which may be made of a natural-based material such as wood, bamboo, etc., or even a plastic-type material) that can "read" tiles, e.g., using radio-frequency identification (RFID) techniques, and may be controlled/configured via mode cards (that also can be read by the smart block, e.g., using RFID) or a separate standalone application executed by another device as described in further detail herein.

Each tile (e.g., tile 102A) may be made of cardstock/board (e.g., 48-point card stock), stiff paper, wood, etc., and include one or more objects (e.g., object 104A—an apple) depicted on one or both sides, which may or may not be different. Each tile may include one or more RFID tags embedded within (or otherwise attached to) the tile that may provide values that are "unique" within the system (across all tiles) or unique within a particular set of tiles 102.

A mode card may be similar in physical makeup to a tile, though in some embodiments is much larger, and may include multiple depicted objects (with corresponding RFID tags and values), and these objects may allow the smart block (or use thereof) to be configured in some manner, such as by setting state data to adjust the block's current language, type of "mode," etc. For example, in some embodiments a mode card includes one or more language selection icons 110 (e.g., flags) that when selected cause the smart block language to be set to a corresponding language. Additionally, or alternatively, the mode card may include one or more mode selection icons 108 allowing the smart block to be changed into different operational modes, e.g., a "play" or "explore" mode (corresponding to the depicted binoculars) allowing unstructured play in which the block will play sounds and/or illuminate when placed upon tiles, and/or a "quiz" mode (e.g., corresponding to the graduation cap) in which the smart block may request (e.g., via playing a spoken command or question via a speaker) the user to scan a particular tile, and/or a "definition" mode (e.g., corresponding to the illustrated pile of books) where the smart block may read a definition of an object illustrated or spelled out on a tile, or used within quiz mode to cause the smart block to provide a definition to prompt the user to select the tile of the word/object associated therewith.

For example, the smart block while operating in quiz mode may ask questions or issue commands associated with a set of tiles, e.g., ask the user to "touch the apple" or "touch the tiger," "touch the letter F," "what is 3 plus 4," or the like. The smart block may respond differently based on what tile was detected, e.g., upon selecting a correct tile the block may play a "positive" sounding noise such as a chime or chord, vibrate the block, and/or illuminate the LEDs in some manner (e.g., flash the LED, show a rainbow of colors, etc.); similarly, upon selecting an incorrect tile the block may play a "negative" sounding noise such as a buzzer, vibrate the block, and/or illuminate the LEDs in some manner (e.g., flash a red LED). The smart block may record the result of these commands as part of log data as described herein, which may be presented to a parent or guardian (e.g., as summary data) and/or used to select/configure additional quizzes for the user.

As is known to those of skill in the art, radio-frequency identification (RFID) uses electromagnetic fields to automatically identify and track tags attached to objects. An RFID tag includes a "tiny" radio transponder; a radio receiver and transmitter. When triggered by an electromagnetic interrogation pulse from a nearby RFID reader device, the tag transmits digital data, usually a number, back to the RFID reader. There are several types of RFID tags. Passive tags are powered by energy from the RFID reader's interrogating radio waves; whereas active tags are powered by a battery and thus can be read at a greater range from the RFID reader, perhaps up to hundreds of meters. Unlike a barcode, an RFID tag doesn't need to be within the line of sight of the reader, so it may be embedded in the tracked object. RFID is one method of automatic identification and data capture (AIDC).

In some embodiments, when a person moves the smart block over or onto a tile, an RFID reader in the smart block scans an RFID tag in the tile, and one or more actions/operations may be performed by the smart block, including one or more of:

One or more audio files (e.g., recordings of music, animal sounds, words, etc.) are played by a speaker of the smart block (or a nearby speaker that the block is communicatively coupled with)

One or more light devices (e.g., LEDs) may be illuminated—e.g., behind a semi-opaque or clear portion of the block, causing this layer to "glow"—indicating the touch of block to tile. For example, if the tile is part of a "color pack" of tiles, the logo will glow with a color selected based on the tile—e.g., a red light is emitted when a "red" object tile is scanned One or more haptic elements of the block may be activated, e.g., the block may vibrate Accordingly, the senses of seeing, hearing, and touching may all be stimulated through the system, creating a multisensory learning experience, which has been shown to produce better learning outcomes for children of all abilities.

Figure 2:
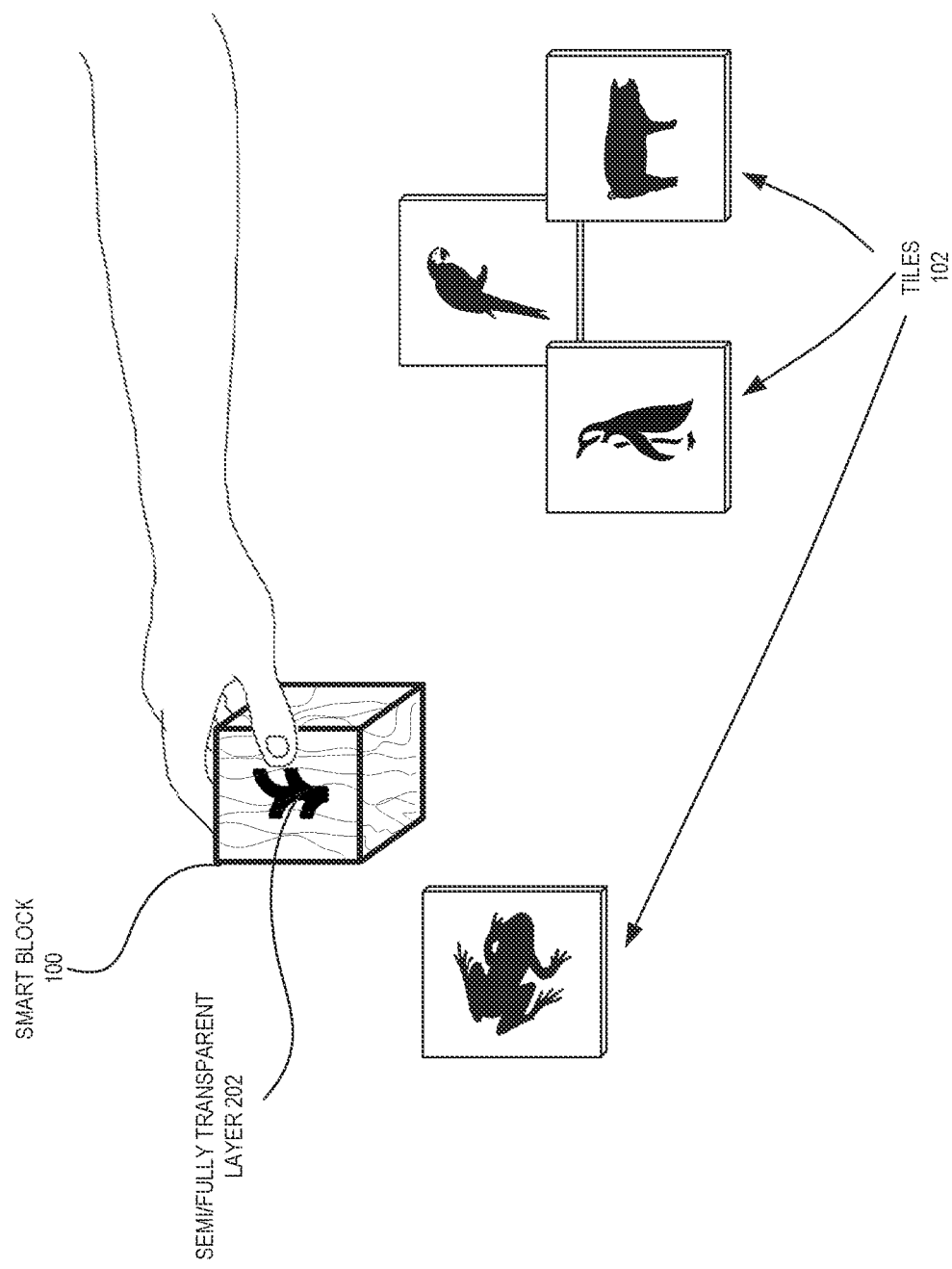
FIG. 2 is a diagram illustrating an environment including a smart block and multiple tiles according to some embodiments.

FIG. 2 is a diagram illustrating an environment including a smart block 100 and multiple tiles according to some embodiments. In this example, a child may use a smart block with a collection of tiles 102 (also referred to herein as a "tile pack"), which as shown include depictions of different animals. In some embodiments, these tiles may also include other objects depicted on their other side, such as text representing a name of the animal, etc. As shown, a child may move the smart block over a tile—e.g., with an illustrated object depicting a frog—and the smart block may read the tile's RFID tag to obtain the value reported by the RFID tag and use this value to, e.g., identify and play an audio file corresponding to the tile (e.g., a recording of the word "frog" using the block's speaker in a particular language), identify a color associated with the tile value (or a particular object depicted on the tile) and illuminate one or more LEDs (through a semi or fully transparent layer 202 of the block, which may be a shape such as a logo of the company making the block) for an amount of time in that color (e.g., "green" for the frog tile, whereas the color may be "yellow" for a canary/bird). The smart block may also perform one or more other general actions in response to an RFID reading of a value, such as vibrating, recording the "tile scan" action in a log (e.g., indicating that a particular tile was read, possibly with an associated timestamp), changing a state of an internal state machine corresponding to a mode of play (e.g., to advance a game to a next phase or stage), etc. This may continue when the child moves the smart block over another tile (e.g., a dog, a cow, a giraffe, etc.) and tile-specific, tile-agnostic, and/or mode-based operations may be performed by the smart block.

The smart block system may also help people learn foreign languages. When a mode card with a depicted nation's flag (or other indicator of a language, such as text ("English," "Italian," "Spanish," "Mandarin," etc.), a picture that is representative of a country or language, etc.) is scanned, a language state setting of the block (e.g., stored as part of state data 320 shown later in FIG. 3) can be updated that changes the language of the audio file played. For example, if the tile of a cat is scanned, the block would say "cat" and the LED may glow orange. If a child then wants to change the language to Spanish, they would touch the smart block to a depiction of the Spanish or Mexican flag (among many other possibilities) to read a RFID value associated with the Spanish language and cause the block to update its language state (e.g., a value stored in a memory or storage location of the block). Now, the block would say "gato" upon the block being placed onto (or adjacent to) the cat tile. Similarly, if the block is placed on a depiction of a Chinese flag (e.g., for Mandarin, among others such as Cantonese), it would say "Māo."

Embodiments may remain useful through a child's early development through expansion. There may be a great number of tile packs used in a large library of subjects, including shapes, colors, numbers, math, classical composers, music, etc., in one or more supported languages. Moreover, the block's internal software (e.g., code 316 shown later in FIG. 3) can be updated, e.g., via a low power communication interface (e.g., Bluetooth), a wired or wireless network interface (e.g., a WiFi chip, USB communications interface, etc.), to add features, and/or allow for expansion with future tile packs and languages.

Figure 3:
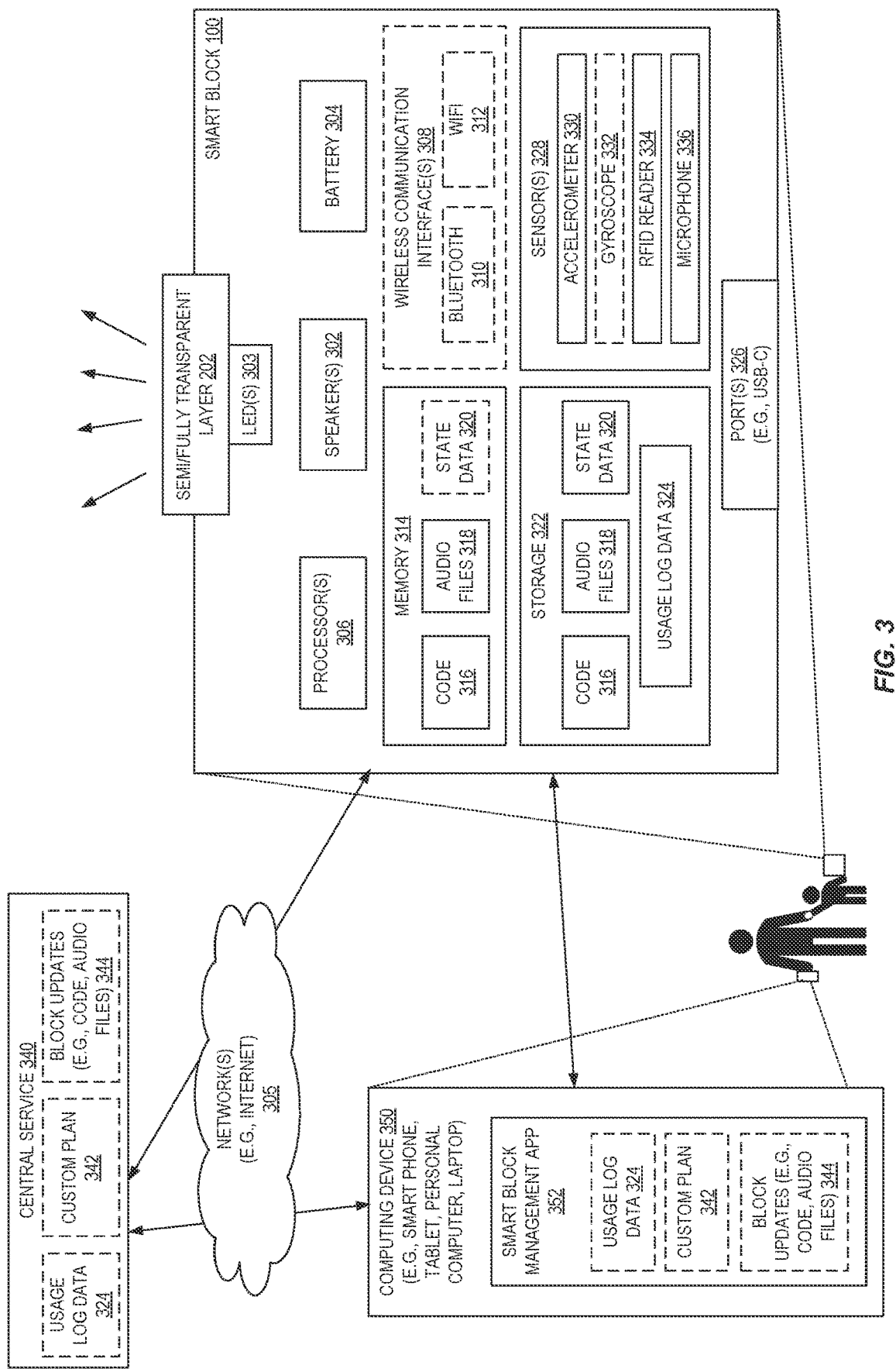
FIG. 3 is a diagram illustrating an environment including a smart block device, a smart block management application, and a remote central service according to some embodiments.

FIG. 3 is a diagram illustrating an environment including a smart block device 100, a smart block management application 352, and a remote central service 340 according to some embodiments. FIG. 3 shows an exemplary smart block of some embodiments, which may include a custom PCB with one or more processors 306, a memory 314, one or more LEDs 303 for color visualization, a battery 304, a speaker 302, a storage device 322 (e.g., a flash memory card such as an SD card, including but not limited to a microSD card, miniSD card, SHC card, SDXC card, SDUC card, or the like), a set of ports 326 (e.g., a USB port such as a USB micro port, USB mini port, USB-C port, USB A or USB B port, etc.) for data transfer and/or charging, a wireless charging unit, one or more sensor devices 328 such as an accelerometer 330 and/or gyroscope 332 (e.g., for detecting when a block is picked up, to turn on the block or functionality of the block; for detecting when a block is no longer being used, to turn on the block or functionality of the block; for part of a "game" mode where a child needs to shake or move the block), an RFID reader 334 or other Near Field Communication (NFC) component, an optical sensor/camera unit, a microphone 336 (for voice-based games, detecting when the device is or isn't being used, configuring a volume of the speaker(s) of the block, etc.). However, it is to be understood that some or all of these components may be omitted in various embodiments—e.g., embodiments may not include a gyroscope 332, wireless charging units, microphones, wireless interfaces, or the like. Moreover, though embodiments described herein focus upon the use of RFID technologies, it is to be understood that other embodiments may use other technologies such as NFC communications, optical sensors (e.g., via barcodes, QR codes, or the like), etc., to interact with mode cards, tiles, etc.

A smart block management application 352 (or "app") may be used, e.g., by a guardian of the child, the manage and/or observe and/or configure the smart block. The app may track the child's use of the block via receiving usage log data 324 transmitted from the block on a periodic basis or continual basis, either directly from the block via Bluetooth, WiFi (e.g., wireless communications adherent to the IEEE 802.11 suite of protocols), or a physical cable such as USB; or indirectly via a central service 340 (that the block may have been sending usage log data 324 to, such as via its WiFi connection through the internet 305 to the central service 340).

This usage log data 324 may indicate dates and/or times of the block's use, which tiles or tile packs were used, which modes of interaction were used, which tiles were correctly or incorrectly selected (such as during a game or quiz mode of operation), etc. The app 352 or central service 340 (e.g., via machine learning/artificial intelligence-based techniques that analyze the child's characteristics and/or performance) may also be used to create a custom plan 342 for the child's later use, e.g., by analyzing the child's performance or usage of the block and suggesting/scheduling further play/learning based on this analysis. For example, the plan 342 could cause the child to further revisit certain concepts the child was/is struggling with (e.g., doing addition problems with numbers greater than five or ten, identifying colors or particular colors, reading particular words or phrases, etc.), or cause new tile packs to be ordered or recommended for use based on detecting a child's preferences (e.g., an observed fondness for animals may lead to a recommendation of more animal or science related tiles) or performance (e.g., when a child's performance is high enough to indicate a mastery of a concept, tiles corresponding to a next level of difficulty could be suggested/ordered), etc. This technique could be used as part of a "smart subscription" where a parent may request a central service 340 to automatically provide (or recommend) different tiles based on one or more of the child's performance learning performance, age, observed preferences, etc.

The app 352 may also be used to specifically customize the block for a particular child. For example, to configure a block for a three-year-old boy who likes animals and math, the app can be used to install data/logic to the device for that (referred to as block updates 344, which may include logic for particular modes of operation as implemented using code 316, audio files 318 corresponding to tiles in one or more languages, etc.). As another example, if a child is two years old and just working on manipulative dexterity, the app may be used to just set up the smart block device for learning simple numbers. Later, as the child grows older, the app may be used to extend the block to, e.g., teach languages, more advanced concepts, etc. As indicated, the block updates may be sent from the app (e.g., via a physical or wireless interface to the block) or from a central service (e.g., across the internet and locally provided via a physical or wireless interface to the block).

In some embodiments, many different groupings of tiles (tile packs) may be used, such as number tiles (e.g., reading the numbers 0-10 out loud during an "exploration" mode of play, quizzing the identification of these numbers in a "quiz" mode of play), animals, pets, colors, phrases, music, shapes, math (e.g., addition, subtraction, multiplication, division), religions, ocean creatures/objects/plants, spelling, flags of the world, transportation, cooking, botany, months of the year, foods, exploration of the world or locations, presidents or leaders, a drum or instrument mat for playing musical sounds, furniture, art history, zoo animals, professions, clothes, sports, types of money, states or provinces of a country, hospital objects, musical composers, birds, household objects, insects, dinosaurs, weather, body parts, holidays, planets, tools, and many other types of possibilities. Embodiments are also multilingual and can be configured (via an app, or the smart block itself via use of a mode card) to work in one or multiple languages, such as Spanish, English, Mandarin, French, German, Spanish, Arabic, and/or others. Further, the types of modes of operation, the types of supported tiles, the different languages, etc., can be changed over time, such as through a low-powered interface like Bluetooth.

Further, embodiments described herein provide a tech-forward smart wooden block for use by very young children to adults. Based on Montessori principles, embodiments can teach languages, STEM, and an expanding library of subjects, all without a screen. Embodiments remain fun and very intuitive and allow children to explore through touch and sound. Embodiments provide successful, repetitive practice that helps reinforce speech and cognitive development; embodiments can be configured to give children opportunity to practice concepts repeatedly. Embodiments are thus screenless, provide hands-on learning, grow with a child (e.g., via a smart subscription), are child-centered, and made up of substantial amounts of natural materials.

Embodiments provide language learning, and can also be used for speech therapy assistance, and may be well-suited for use with children having autism, down syndrome, developmental delays, or learning disabilities. The smart block in some embodiments has an approachable look and friendly voice to promote speech development, cognitive development, manipulative dexterity and more.

Embodiments are also Montessori friendly:
Repetition—as repetition is the secret of perfection, quizzes of some embodiments give kids fun and instant feedback on what they've learned.
Child-Centered—each child learns at their own pace, so the tile packs support each child's specific development cycle.
Hands-on Learning—Children learn through their senses. Embodiments teach children critical skills through play.
Montessori Materials—Inspired by classic wooden blocks, embodiments can be made from natural materials providing a calming environment.

Figure 4:
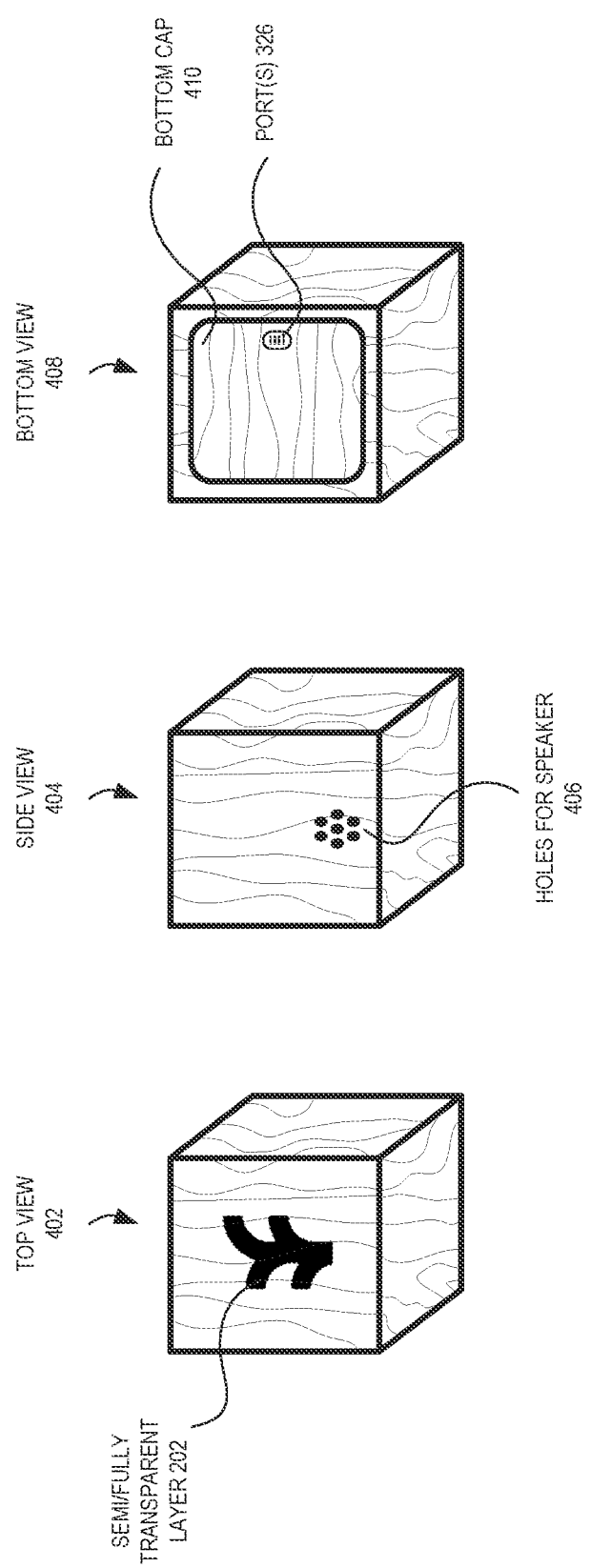
FIG. 4 is a diagram illustrating multiple views of an exemplary smart block device according to some embodiments.

FIG. 4 is a diagram illustrating multiple views (e.g., top view 402, side view 404, bottom view 408) of an exemplary smart block device according to some embodiments. The smart block device may be small and light enough to be easily interacted with by a child (e.g., a few inches by a few inches in each of three dimensions, such as approximately 2" by 2" by 2"), and include relatively few adornments and notably, no screen. The block may include a semi or fully transparent layer 202 allowing for light to be emitted by the block (e.g., on one or multiple sides of the block), holes 406 for audio to be emitted, a charging/data transfer port 326 (e.g., a USB interface port), and/or a removable cover/cap 410. For example, the holes 406 for the audio generated by the speaker device to be emitted may be on a side of the block as shown by side view 404, the semi or fully transparent layer 202 may be on a "top" of the block as shown by top view 402, and the cap 410 and/or ports 326 may be on a "bottom" of the block as shown by bottom view 408. However, these locations are different in different embodiments—e.g., the port(s) 326 may be on a same or different side as those speaker holes 406—and moreover, more or fewer physical features may exist than as shown, such as a physical on/off switch or the like.

In some embodiments, a smart block device system may include one or more packs of tiles made mainly of paper board (e.g., a first tile set (e.g., for animals), a second tile set (e.g., for colors)) provided in a cotton case or similar material, a smart block that may be designed to be eco-friendly and sustainable via use of real wood for the blocks, a mode card made mainly of paper board, and/or a carrying case (e.g., in cotton).

A smart block management application, according to some embodiments, may provide a user interface for use in controlling and/or monitoring the use and/or functionality of the smart block. As described herein, the app may obtain use data/usage log data from the smart block device itself (e.g., via a periodic Bluetooth transmission) or from a central service, and present this information in raw or consolidated/analyzed form via the app. The app may also recommend additional modes, quizzes, and/or tile sets, which may be obtained via a virtual storefront exposed by the app. The app may also allow the user to configure the smart block, e.g., to select installed/enabled languages, installed/enabled tile packs, etc. The app may also allow the user to share results of the play, e.g., with a teacher or therapist.

Figure 5:
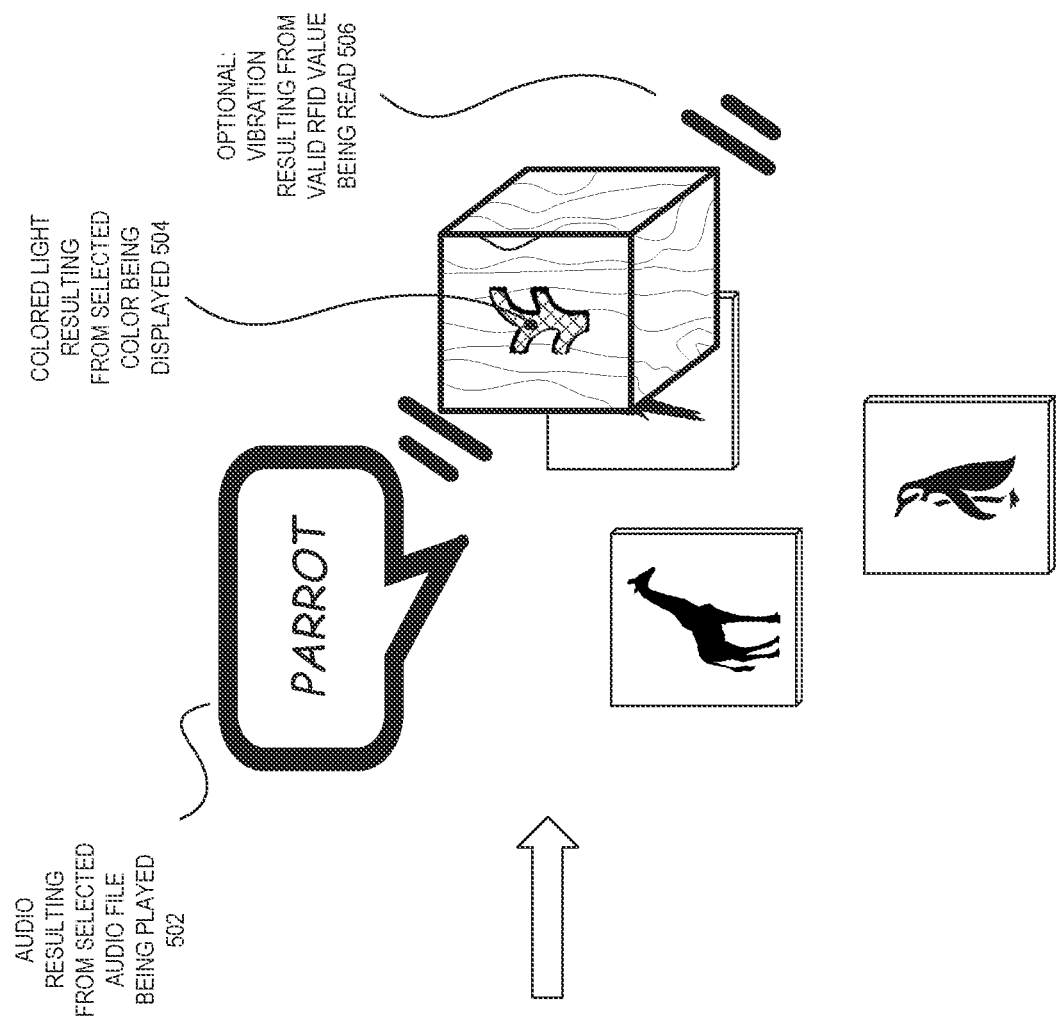
FIG. 5 is a diagram illustrating some exemplary actions performed by a smart block device with a tile according to some embodiments.
Figure 5:
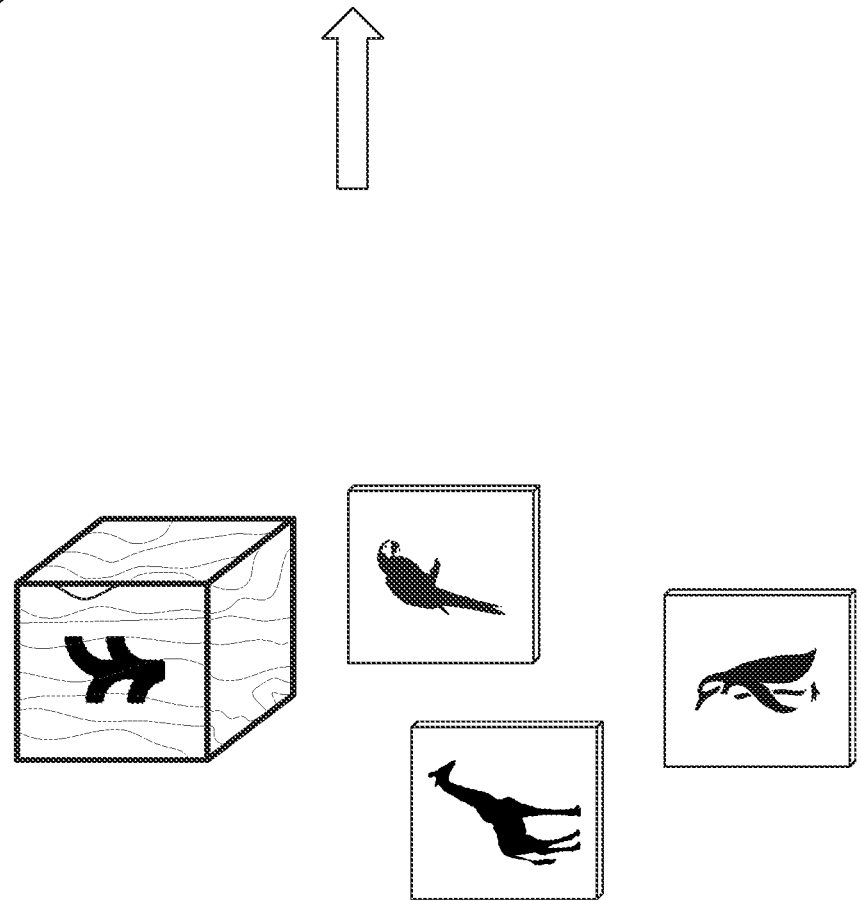

FIG. 5 is a diagram illustrating some exemplary actions performed by a smart block device with a tile according to some embodiments. In one illustrated scenario, a user may use a tile pack of "animals" where each tile has a depiction of an animal on it—here: a giraffe, a parrot, and a penguin. The user may have the tiles available on a surface such as a table, floor, desk, etc.

The user may pick up the smart block, which might detect the movement/use of the block (e.g., via one or more sensors described herein, such as an accelerometer, gyroscope, etc.) and turn itself on, or the user (or another person) may turn the device on via a physical switch.

Assuming the user is in "play" mode, the user may place the smart block on or near a tile—here, the "giraffe" object tile. The giraffe tile may have a unique RFID value, e.g., "2", that is read by the RFID reader of the smart block.

The code of the smart block may then, based on this value, identify a sound file and/or LED color. For example, based on a current language state value (e.g., "English") and the value of "2", the device may identify an audio file that is in the current language that corresponds to that value—e.g., "2 english.mp3" or "giraffe english.mp3" (where the device has a data structure mapping the value "2" to "English"), for example. Similarly, based on the value, the smart block device may additionally or alternatively identify a light mode, e.g., that the LED color should be set to orange. Thus, the smart block may set the LED 504 to the color orange for a period of time, and/or play the selected sound file 502, which may be a recording of someone pronouncing the word "giraffe" in English. Alternatively, in some embodiments the block employs a text-to-speech library/engine that may simply pronounce the word "giraffe" (after having identified the word using the RFID value of 2). Additionally, or alternatively, in some embodiments the smart block device may vibrate as shown by 506.

Operation may be similar in "quiz mode," which may be activated by scanning a quiz mode icon on a mode card. The block may use stored state to determine what game to play (e.g., which games/tiles are enabled, which games have yet to be completed, etc.) and/or what questions are to be asked (e.g., which questions have not yet been answered correctly), as described above. The smart block may then give a verbal command or question via its speaker, e.g., "what is ten plus two?" or "where is the tiger?", and upon the user placing the block on a tile, the block may determine if the selected tile was the correct tile, and perform one or more responsive actions based on whether it was correct—e.g., playing a noise/sound, turning on a light, vibrating, etc. If the selection was incorrect, the block may ask the question again, and if the selection was correct the device may ask a next question. The results of each interaction may be recorded as part of log data and ultimately provided back to the app or central service at a same or later point in time.

Figure 6:
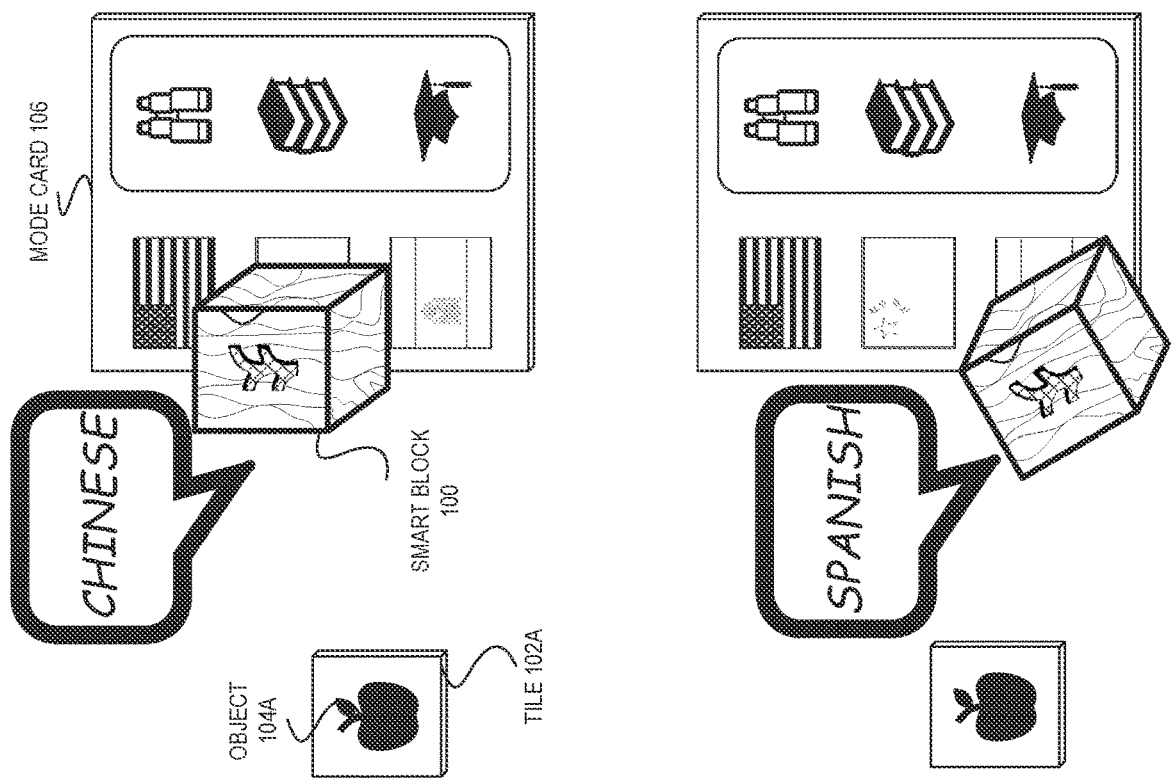
FIG. 6 is a diagram illustrating different exemplary actions performed by a smart block device via use of a mode card and a tile according to some embodiments.

FIG. 6 is a diagram illustrating different exemplary actions performed by a smart block device via use of a mode card 106 and a tile 102A according to some embodiments. At top left, the smart block is placed on a Chinese flag icon of a mode card, and the smart block reads an RFID value from the mode card corresponding to Mandarin, causing the smart block to change its internal state to be in the Mandarin language (e.g., set a state language value) and optionally signify this state change by illuminating the block (e.g., to red, which is based on the value) and playing an audio file (e.g., to speak out the word "Chinese" or "Mandarin"—either in a native language and/or in a previously-set language). Upon the user placing the block over an apple tile 102A, the block may read the apple RFID value, identify a color (red) and audio file (e.g., apple_mandarin.mp3), and set the LED to the color and play the audio file via the speaker, which may say the Mandarin word for apple, which is "ping guo". Similarly, as shown at bottom left, the user may place the block over a Spanish flag language icon of the mode card, and the device responds with a yellow LED and the word "Spanish" (e.g., in a "home" language of English). Thereafter, upon again placing the smart block device over the same apple tile as shown on the bottom right, the smart block device responds with the red LED and an audio recording of the word apple in Spanish, which is "manzana."

Figure 7:
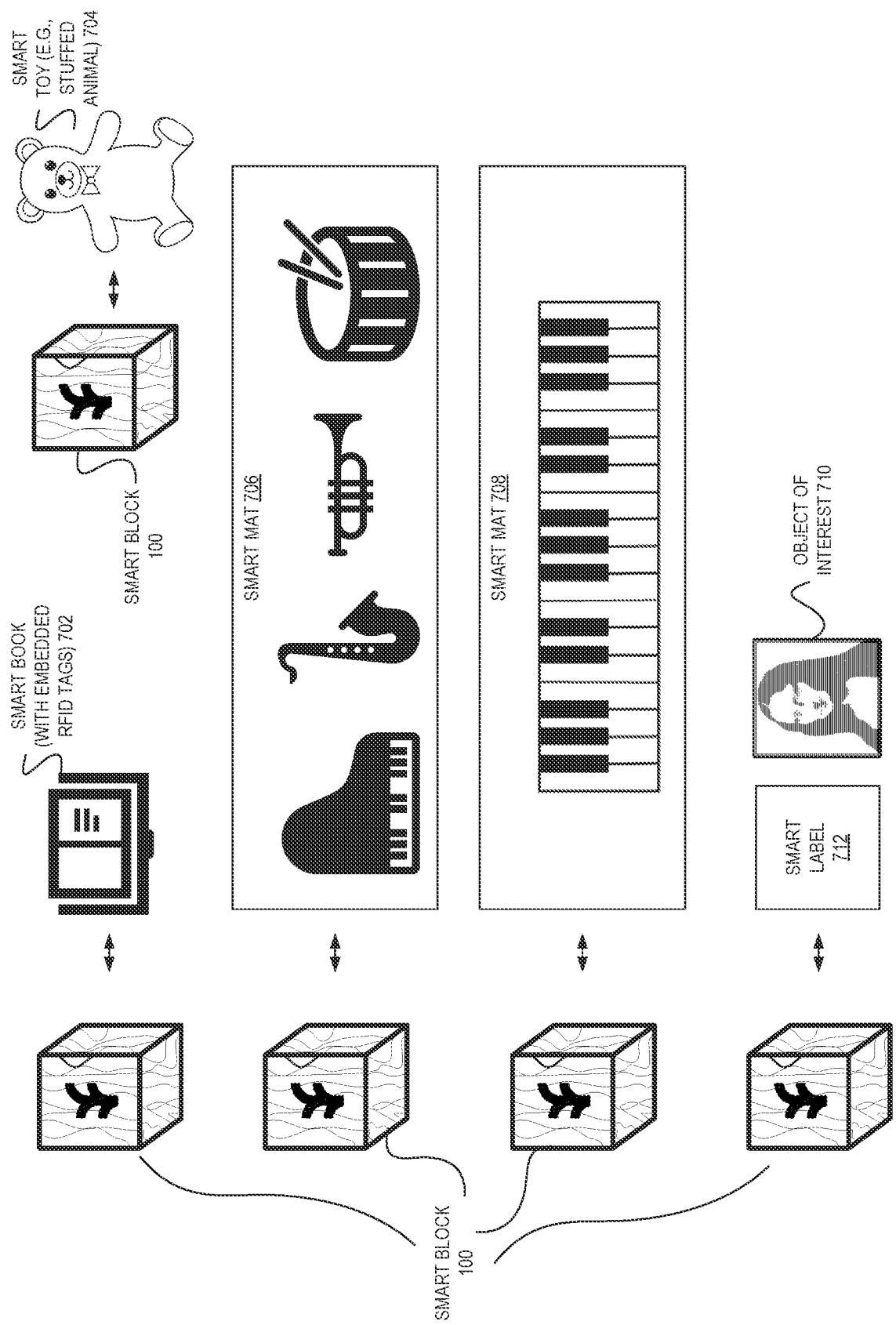
FIG. 7 is a diagram illustrating different smart block systems according to some embodiments.

Although embodiments are described with regard to tiles, other use cases with potentially different forms exist. FIG. 7 is a diagram illustrating different smart block systems according to some embodiments. In some embodiments, specialized smart books 702 may be used in conjunction with a smart block device.

For example, a page may have an RFID tag embedded somewhere that, when read by the smart block, may cause the block to read out some or all of the text on the page (e.g., a full page, a paragraph, a line, a word, etc.) in some selected or default language.

For example, in some embodiments an "advanced" word for a young reader may be denoted as being a smart word, e.g., via a color or font or other graphic, and underneath the word an RFID tag may be embedded which, when read by the smart block device, may sound out the word (e.g., on a syllable-by-syllable basis) and/or pronounce the entire word. The smart block device may also, as part of scanning that single RFID tag (or, by scanning other nearby RFID tags), play a definition of the word, describe synonyms of the word, or the like.

In some embodiments, the RFID tags may be embedded in a "smart mat" 706 or 708 which may be made of cloth/fabric or another material. The mat may include RFID tags corresponding to different instruments allowing the user to hear or play with the instrument, such as a piano, saxophone, trumpet, drums, etc. The smart mat may include one or multiple instruments and may even allow for playing different notes of an instrument, such as via an illustrated keyboard with multiple keys. This mat may be used in a "play" mode as described herein for open-ended playing of music, or in a "quiz mode" to help the user learn how to identify notes, play songs, etc.

The smart block may also interact with smart labels 712, which may be similar to the tiles described herein. A smart label may be used in some environment in association with another object of interest 710, e.g., a painting, display, or other work of art in a museum. Upon being scanned, the smart block device may play music associated with the object (e.g., play a song by a depicted musician, play a song recorded using an exhibited instrument), describe the object (e.g., describe the painter of a painting, describe the painting itself in terms of its history, style, etc.). In such cases, the block updates for these uses can be provided through the app, or provided by a device within the location where the smart labels are used (e.g., in a museum) upon the block interacting with that device, being plugged into that device, etc.

The smart block could also be used with a different type of toy 704, such as a teddy bear, which could have one or more RFID tags/values embedded therein, allowing a user to interact with the toy, e.g., read out the name of the bear's body parts, etc.

In some embodiments, a flow of operations may be performed by the smart block device. In some embodiments, the flow may include: detecting, by a sensor of a smart toy device, a first value; updating, by the smart toy device, a current language value based on the first value; detecting, by the sensor of a smart toy device, a second value; selecting, based on the second value, a color from a plurality of candidate colors; selecting an audio file based on the second value and further based on the current language value; and playing the selected audio file and causing one or more lighting units of the smart toy device to illuminate according to the selected color.

In some embodiments, a smart toy device may include at least: one or more processors; a speaker device; one or more light emitting diodes (LEDs); a Radio-Frequency Identification (RFID) reader; and a memory storing instructions that when executed by the one or more processors cause the smart toy device to perform operations comprising: selecting, based on an RFID value detected by the RFID reader, a color from a plurality of candidate colors that the one or more LEDs support; selecting an audio file based on the RFID value and further based on a current language value; and causing the speaker device to play the selected audio file and the one or more LEDs to illuminate according to the selected color.

In some embodiments, a system may include at least: a mode card, the mode card comprising a plurality of graphical elements and a corresponding plurality of Radio-Frequency Identification (RFID) tags; a tile card comprising at least a graphical element and a corresponding RFID tag; and a smart toy device comprising a speaker, one or more lighting units, an RFID reader, one or more processors, and a non-transitory computer-readable storage medium having instructions that when executed by the one or more processors cause the smart toy device to perform operations comprising: reading, from the mode card, a first value from one of the plurality of RFID tags; updating a current language value based on the first value; reading, from the RFID tag of tile card, a second value; selecting, based on the second value, a color from a plurality of candidate colors; selecting an audio file based on the second value and further based on the current language value; and causing the speaker of the smart device to play the selected audio file and the one or more lighting units to illuminate according to the selected color.

Alternatively, or additionally, in some embodiments the smart block device may use another non-RFID based technology for interacting with tiles or mode cards, such as the use of barcodes printed on tiles or mode cards that can be read by an optical-based barcode scanner of the smart block device. Of course, a variety of technologies exist that could be implemented by one of skill in the art, such as a range of passive RFID systems, active RFID systems, barcodes, QR codes, GPS chips, Bluetooth Low Energy (BLE) systems, optical scanners/object recognition machine learning models, etc.

Exemplary Electronic Devices

As described herein, one or more parts of an embodiment may be implemented using different combinations of software, firmware, and/or hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices.

Figure 8:
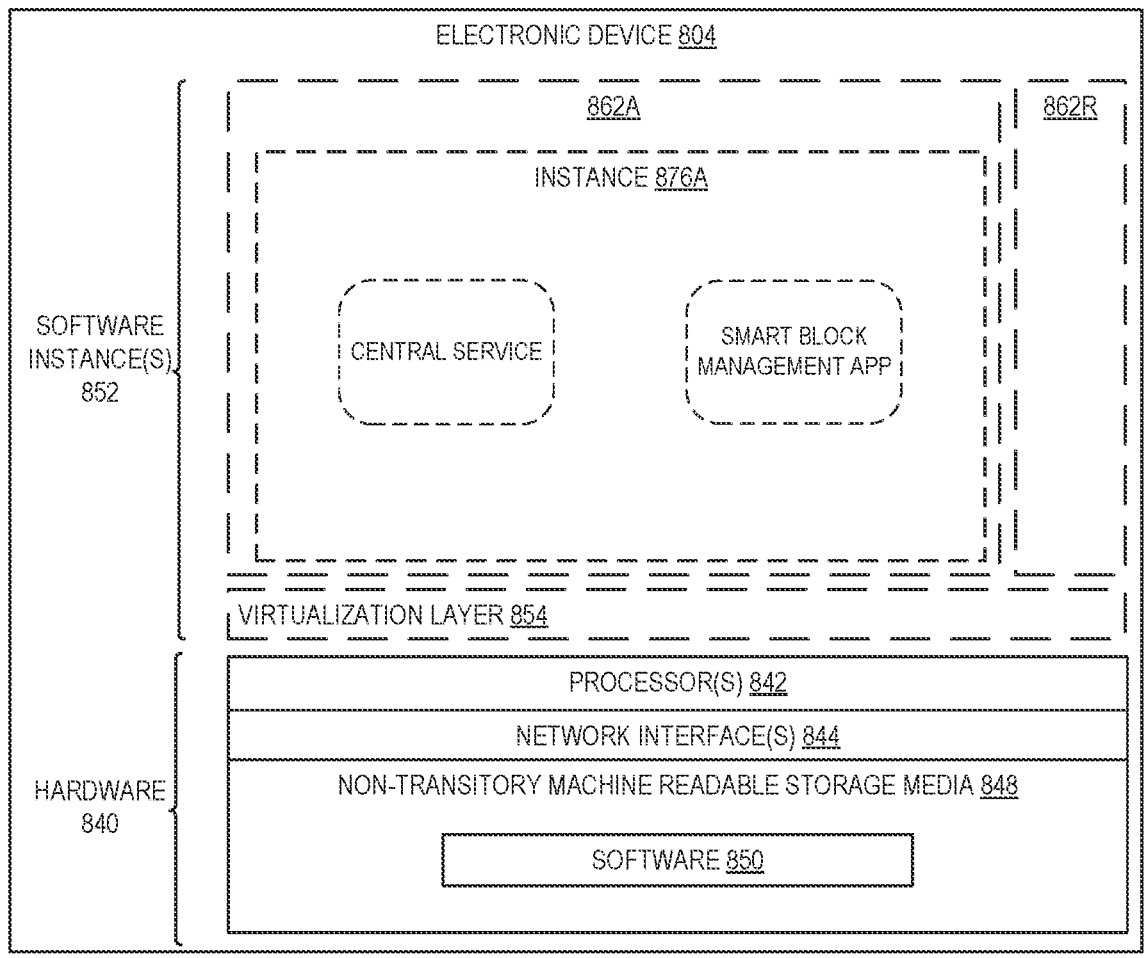
FIG. 8 is a block diagram illustrating an exemplary data processing system that can be used in some embodiments.

FIG. 8 illustrates an electronic device 804 according to some embodiments. FIG. 12 includes hardware 840 comprising a set of one or more processor(s) 842 and a set or one or more network interfaces 844 (wireless and/or wired), as well as non-transitory machine-readable storage media 848 having stored therein software 850. Each of the central service and/or smart block management app may be implemented in one or more electronic devices 804.

In electronic devices that use compute virtualization, the processor(s) 842 typically execute software to instantiate a virtualization layer 854 and software container(s) 862A-862R (e.g., with operating system-level virtualization, the virtualization layer 854 represents the kernel of an operating system (or a shim executing on a base operating system) that allows for the creation of multiple software containers 862A-862R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-862R each represent a tightly isolated form of software container called a virtual machine that is run by the hypervisor and may include a guest operating system; with para-virtualization, an operating system or application running with a virtual machine may be aware of the presence of virtualization for optimization purposes). Again, in end stations where compute virtualization is used, during operation an instance of the software 850 (illustrated as instance 876A) is executed within the software container 862A on the virtualization layer 854. In end stations where compute virtualization is not used, the instance 876A on top of a host operating system is executed on the "bare metal" electronic device 804. The instantiation of the instance 876A, as well as the virtualization layer 854 and software containers 862A-862R if implemented, are collectively referred to as software instance(s) 852.

Alternative embodiments of an electronic device may have numerous variations from that described above. For example, customized hardware and/or accelerators might also be used in the server end stations.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" and the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

Thus, various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this description and claims, the terms "coupled" and "connected," along with their derivatives, may be used. It should be understood that these terms are not intended as synonyms for each other. "Coupled" is typically used to indicate that two or more elements, which may or may not be in direct physical or electrical contact with each other, co-operate or interact with each other. "Connected" is typically used to indicate the establishment of communication between two or more elements that are coupled with each other.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

At least some embodiments of the disclosed technologies can be described in view of the following clauses:

1. A method comprising: detecting, by a sensor of a smart toy device, a first value; updating, by the smart toy device, a current language value based on the first value; detecting, by the sensor of a smart toy device, a second value; selecting, based on the second value, a color from a plurality of candidate colors; selecting an audio file based on the second value and further based on the current language value; and playing the selected audio file and causing one or more lighting units of the smart toy device to illuminate according to the selected color.

2. A smart toy device comprising: one or more processors; a speaker device; one or more light emitting diodes (LEDs); a Radio-Frequency Identification (RFID) reader; and a memory storing instructions that when executed by the one or more processors cause the smart toy device to perform operations comprising: selecting, based on an RFID value detected by the RFID reader, a color from a plurality of candidate colors that the one or more LEDs support; selecting an audio file based on the RFID value and further based on a current language value; and causing the speaker device to play the selected audio file and the one or more LEDs to illuminate according to the selected color.

3. A system comprising: a mode card, the mode card comprising a plurality of graphical elements and a corresponding plurality of Radio-Frequency Identification (RFID) tags; a tile card comprising at least a graphical element and a corresponding RFID tag; and a smart toy device comprising a speaker, one or more lighting units, an RFID reader, one or more processors, and a non-transitory computer-readable storage medium having instructions that when executed by the one or more processors cause the smart toy device to perform operations comprising: reading, from the mode card, a first value from one of the plurality of RFID tags; updating a current language value based on the first value; reading, from the RFID tag of tile card, a second value; selecting, based on the second value, a color from a plurality of candidate colors; selecting an audio file based on the second value and further based on the current language value; and causing the speaker of the smart device to play the selected audio file and the one or more lighting units to illuminate according to the selected color.

4. A smart toy device comprising: one or more processors; a speaker device; one or more light emitting diodes (LEDs); a barcode reader; and a memory storing instructions that when executed by the one or more processors cause the smart toy device to perform operations comprising: selecting, based on a barcode value detected by the barcode reader, a color from a plurality of candidate colors that the one or more LEDs support; selecting an audio file based on the barcode value and further based on a current language value; and causing the speaker device to play the selected audio file and the one or more LEDs to illuminate according to the selected color.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A smart toy device comprising:
one or more processors;
a speaker device;
one or more light emitting diodes (LEDs);
a sensor component; and
a memory, the memory storing instructions that when executed by the one or more processors cause the smart toy device to perform operations comprising:
 playing, via the speaker device, audio comprising human language instructing a user of the smart toy device to perform an action involving moving the smart toy device;
 obtaining, via the sensor component upon the smart toy device being moved by the user to be adjacent to a first physical item, a first value;
 determining, based on the first value, whether the action was successfully performed;
 selecting a color from a plurality of candidate colors that the one or more LEDs are able to support;
 selecting, based at least in part on the determination of whether the action was successfully performed, a first audio file to be played; and
 causing the speaker device to play at least the first audio file and the one or more LEDs to illuminate according to the selected color.

2. The smart toy device of claim 1, wherein the smart toy device further comprises a communications interface.

3. The smart toy device of claim 2, wherein the operations further comprise:
obtaining, via the communications interface, a set of updates including a plurality of audio files corresponding to a plurality of physical items; and
storing the plurality of audio files within the memory, the plurality of audio files including the first audio file.

4. The smart toy device of claim 2, wherein the operations further comprise:
obtaining, via the communications interface, a command to configure the smart toy device to utilize a first language; and
updating a current language value, stored by the smart toy device, to indicate that a current language setting of the smart toy device is the first language,
wherein the selecting of the first audio file is further based on the updated current language value.

5. The smart toy device of claim 1, wherein:
the first physical item comprises a radio frequency identification (RFID) tag embedded in or on the first physical item and wherein the sensor component comprises an RFID reader;
the first physical item comprises a Near Field Communication (NFC) tag embedded in or on the first physical item and wherein the sensor component comprises an NFC reader component; or
the first physical item comprises a QR code or barcode printed or formed on the first physical item and wherein the sensor component comprises an optical sensor.

6. The smart toy device of claim 5, wherein the first physical item comprises a page of the book.

7. The smart toy device of claim 6, wherein the first audio file, when played by the speaker device of the smart toy device, causes the speaker device to generate audio in a human language that reads text that is printed on the page or an adjacent page.

8. The smart toy device of claim 1, wherein the one or more LEDs are arranged within the smart toy device and are visible through a semi-opaque portion of the smart toy device.

9. The smart toy device of claim 1, wherein the determining whether the action was successfully performed comprises determining that the action was successfully performed based on the first value satisfying a criteria.

10. The smart toy device of claim 1, wherein the operations further comprise:
recording, by the smart toy device in a log data, a result indicating whether the action was successfully performed; and
transmitting the log data to an application or service implemented outside of the smart toy device.

11. The smart toy device of claim 1, wherein the operations further comprise:
determining, based on state data associated with the user, a question to be asked to the user,
wherein the question is associated with the audio comprising human language that, when played, instructs the user of the smart toy device to perform the action involving moving the smart toy device.

12. A method performed by a smart toy device, the method comprising:
playing, via a speaker device of the smart toy device, audio comprising human language instructing a user of the smart toy device to perform an action involving moving the smart toy device;
obtaining, via a sensor component of the smart toy device upon the smart toy device being moved by the user to be adjacent to a first physical item, a first value;

determining, based on the first value, whether the action was successfully performed;

selecting, by the smart toy device, a color from a plurality of candidate colors that one or more LEDs of the smart toy device are able to support;

selecting, by the smart toy device based at least in part on the determination of whether the action was successfully performed, a first audio file to be played; and causing a speaker device of the smart toy device to play at least the first audio file and the one or more LEDs to illuminate according to the selected color.

13. The method of claim 12, further comprising:

obtaining, via a communications interface of the smart toy device, a set of updates including a plurality of audio files; and storing the plurality of audio files within a memory, the plurality of audio files including the first audio file.

14. The method of claim 13, further comprising:

obtaining, via the communications interface, a command to configure the smart toy device to utilize a first language; and updating a current language value, stored by the smart toy device, to indicate that a current language setting of the smart toy device is the first language, wherein the selecting of the first audio file is further based on the updated current language value.

15. The method of claim 12, wherein:

the first physical item comprises a radio frequency identification (RFID) tag embedded in or on the first physical item and wherein the sensor component comprises an RFID reader;

the first physical item comprises a Near Field Communication (NFC) tag embedded in or on the first physical item and wherein the sensor component comprises an NFC reader component; or the first physical item comprises a QR code or barcode embedded in or on the first physical item and wherein the sensor component comprises an optical sensor.

16. The method of claim 12, wherein:

the first item comprises a page of a book; and the first audio file, when played by the speaker device of the smart toy device, causes the speaker device to generate audio in a human language that reads text that is printed on the page.

17. The method of claim 12, wherein the determining whether the action was successfully performed comprises determining that the action was successfully performed based on the first value satisfying a criteria.

18. A system comprising:

one or more physical items, wherein each physical item includes at least one Radio Frequency Identification (RFID) tags embedded or attached thereto; and a smart toy device, comprising:

one or more processors;

a speaker device;

one or more light emitting diodes (LEDs);

a sensor component; and a memory storing instructions that when executed by the one or more processors cause the smart toy device to perform operations comprising:

playing, via the speaker device, audio comprising human language instructing a user of the smart toy device to perform an action involving moving the smart toy device;

obtaining, via the sensor component upon the smart toy device being moved adjacent to a first item from the one or more physical items, a first value;

determining, based on the first value, whether the action was successfully performed;

selecting a color from a plurality of candidate colors that the one or more LEDs support;

selecting, based at least in part on the determination of whether the action was successfully performed first value, a first audio file to be played; and causing the speaker device to play at least the first audio file and the one or more LEDs to illuminate according to the selected color.

19. The system of claim 18, wherein the one or more physical items comprise one or more tiles, each tile being at least partially made of cardstock, cardboard, paper, or wood.

20. The system of claim 18, wherein the first physical item comprises a book, wherein the RFID tag of the book is embedded into or placed on a page of the book.

* * * * *